Oct. 17, 1961     J. D. GAUTIER, JR     3,004,281

VEHICLE DOOR BUMPER

Filed Sept. 10, 1958

James D. Gautier, Jr.
INVENTOR.

BY Clarence A. O'Brien
and Harvey B. Jacobson
Attorneys

3,004,281
VEHICLE DOOR BUMPER
James D. Gautier, Jr., El Paso, Tex.
(P.O. Box 633, Kreole, Miss.)
Filed Sept. 10, 1958, Ser. No. 760,141
3 Claims. (Cl. 16—86)

This invention relates to new and useful improvements in vehicle door bumpers and has for its primary object to provide, in a manner as hereinafter set forth, novel means for preventing damage to the door or to an adjacent vehicle or other object which it may strike when opened.

Another important object of the present invention is to provide a bumper of the aforementioned character which may be readily mounted on conventional vehicle doors without the necessity of structurally altering the same.

Still another important object of the invention is to provide a vehicle door bumper of the character described comprising a cushion or pad which may be expeditiously removed for replacement, if desired.

Other objects of the invention are to provide a vehicle door bumper of the character set forth which will be comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
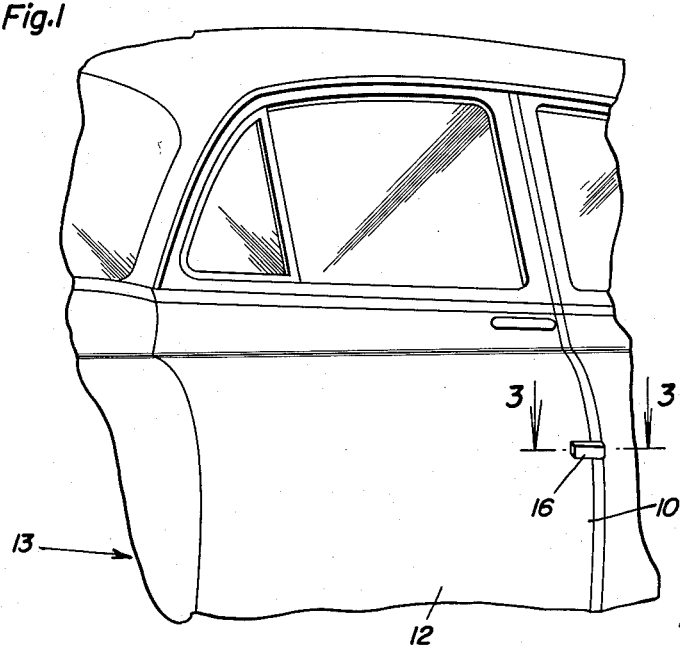
FIGURE 1 is a perspective view, showing a bumper embodying the present invention in position on a vehicle door.
Figure 2:
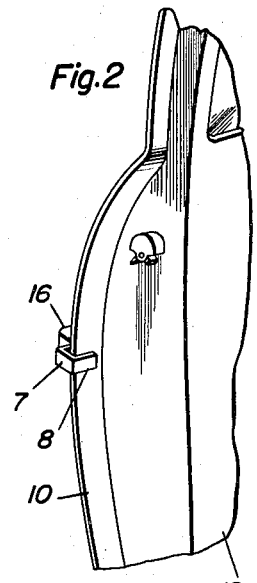
FIGURE 2 is a perspective view, showing the door open.

Referring now to the drawing in detail, it will be seen that the embodiment of the invention which has been illustrated in FIGURES 1 to 4, inclusive, of said drawing comprises a substantially U-shaped clip or clamp 7 of suitable metal. The clamp 7 includes an inner end portion or leg 8 and a relatively long outer end portion or leg 9.

Figure 3:
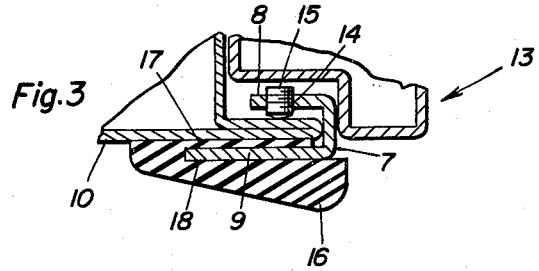
FIGURE 3 is an enlarged view in horizontal section, taken substantially on the line 3—3 of FIGURE 1.
Figure 4:
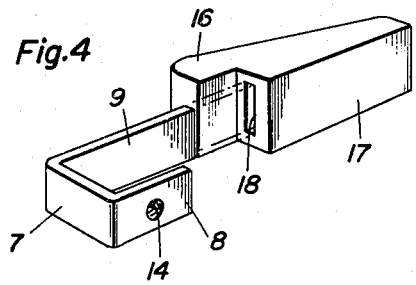
FIGURE 4 is a perspective view of the device per se, showing a portion of the mounting clamp in dotted lines.

The clamp 7 is adapted to be removably mounted on the usual flange 10 on the free end of a door 12 of a motor vehicle 13, as shown to advantage in FIGURE 3 of the drawing. Toward this end, the inner leg 8 of the clamp 7 has formed therein a threaded opening 14 for the reception of a setscrew 15 which is engageable with the door flange 10.

Mounted on the relatively long outer leg 9 of the clamp 7 is an elongated, longitudinally beveled cushion or pad 16 of rubber or other suitable resilient material. The cushion or pad 16 has formed in one end portion thereof a rabbet defining a base portion 17 which abuts the door 12 and the flange 10 thereof and which has formed longitudinally therein a socket 18 which communicates with said rabbet and in which the leg 9 of the clamp 7 is engaged.

It is thought that the use of the device will be readily apparent from a consideration of the foregoing. Briefly, with the setscrew 15 in open or retracted position, the clamp 7 is slipped on the door 12 at the outermost point of said door. The setscrew 15 is then tightened for frictionally securing the device on the door flange 10 in an obvious manner. Of course, the resilient pad 16 prevents the door from contacting an adjacent vehicle or other object when said door is swung to open position. The device may be colored to harmonize with the vehicle on which it is mounted, monogrammed or otherwise attractively ornamented. Should the pad 16 become worn or damaged, said pad may be readily slipped off the clamp 7 for replacement.

Figure 5:
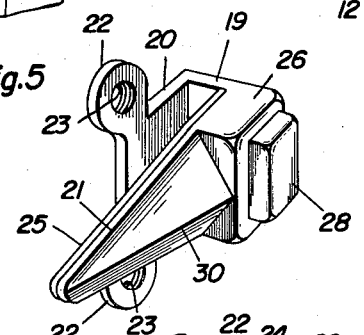
FIGURE 5 is a perspective view of a modified form of the device.
Figure 6:
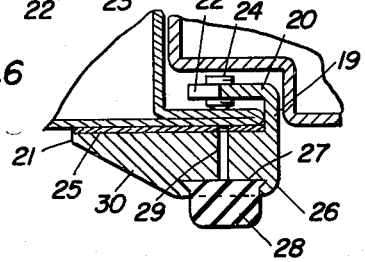
FIGURE 6 is a view in horizontal section, showing the modification installed.

In the modification of FIGURES 5 and 6 of the drawing, reference character 19 designates a substantially U-shaped clamp of suitable metal for mounting on the door flange 10. The clamp 19 includes an inner leg 20 and a relatively long outer leg 21. The leg 20 of the clamp 19 has formed integrally therewith a pair of eyes 22 having threaded openings 23 for the reception of setscrews 24 for securing said clamp on the door flange 10. The leg 21 of the clamp 19 is provided with a protective lining 25 for the vehicle door.

Formed integrally with the inner portion of the leg 21 of the clamp 19 is a base 26. The base 26 is provided with a dovetail or undercut recess or socket 27 for receiving under compression a removable pad or cushion 28 of rubber or other suitable resilient material. A knockout opening 29 is provided to facilitate removal of the pad 28 for replacement, if necessary. From the base 26 to the free or outer end thereof, the leg 21 of the clamp 19 comprises a longitudinally tapered portion 30 of triangular cross-section. This form of the invention is mounted on the door in substantially the same manner as the embodiment of FIGURE 3 of the drawing, it being only necessary to slip the clamp 19 on the door flange 10 and tighten the setscrews 24. To remove the cushion or pad 28 for replacement or for any other purpose, a suitable instrument is inserted in the opening 29.

It is believed that the many advantages of a vehicle door bumper constructed in accordance with the present invention will be readily understood and although preferred embodiments of the device are as illustrated and described, it is to be understood that changes in the details of construction and further modifications may be resorted to which will fall within the scope of the invention as claimed. For example, cushion or pads of the general type shown in FIGURES 5 and 6 of the drawing may, if desired, be removably mounted on the usual ornamental chrome strips with which many motor vehicles are equipped.

What is claimed as new is as follows:

1. A bumper for a hinged vehicle door of the type including a flange on the free end thereof, said bumper comprising a generally U-shaped, rigid metallic clamp adapted to straddle the flange, said clamp comprising a straight inner leg having a threaded opening therein and a relatively long, straight outer leg, an elongated, resilient, longitudinally beveled pad having a rabbet in one end portion and further having a straight socket extending longitudinally thereinto from said rabbet receiving said long leg for removably mounting said pad on the clamp, said rabbet providing a resilient pull tab to facilitate mounting the pad on the clamp, and a setscrew threadedly mounted in the opening and engageable with the flange for removably securing the clamp in position thereon and for frictionally securing the removable pad on said clamp.

2. A bumper for a hinged vehicle door of the type having a flange on its free end, said bumper including a rigid, generally U-shaped metallic clamp for straddling the flange, said clamp comprising a pair of straight, relatively long and short legs and a bight portion connecting said legs, an elongated, resilient pad mounted on the clamp, said pad including an elongated base portion having a straight socket extending longitudinally thereinto from one end thereof and receiving said long leg, and a setscrew threadedly mounted in the short leg for engagement with the flange for removably securing the clamp thereon and for frictionally securing the pad on said long leg, said pad including a resilient, bendable end portion projecting longitudinally beyond said one end of said base portion for substantially covering and concealing said bight portion of the clamp when the door is in its closed position and for providing a pull tab to facilitate applying the pad to the clamp.

3. A bumper for a hinged door of the type having a flange on its free end, comprising a generally U-shaped clamp for straddling the flange, means for securing the clamp on the flange, and an elongated resilient pad removably mounted on the clamp, said pad having a rabbet in one end portion and further having an elongated socket extending longitudinally thereinto from the rabbet and receiving one of the clamp legs for frictionally securing the pad thereon, said rabbet defining a resilient, bendable, longitudinal pull tab on the pad paralleling the clamp in side-abutting engagement therewith and projecting beyond the bight portion thereof for facilitating mounting said pad thereon.

References Cited in the file of this patent

UNITED STATES PATENTS

| 1,409,137 | Earl | May 7, 1922 |
| 2,146,090 | O'Rourke | Feb. 7, 1939 |
| 2,153,896 | Mohar | Apr. 11, 1939 |
| 2,226,615 | Killen | Dec. 31, 1940 |
| 2,596,780 | Meyers et al. | May 13, 1952 |
| 2,740,658 | Kesich | Apr. 3, 1956 |
| 2,837,371 | McKee | June 3, 1958 |
| 2,881,468 | Simone | Apr. 14, 1959 |

FOREIGN PATENTS

| 2,303 | Great Britain | 1911 |
| 1,039,729 | France | May 20, 1953 |